United States Patent
Faizan et al.

(10) Patent No.: US 11,401,673 B2
(45) Date of Patent: Aug. 2, 2022

(54) AUTOMATED SYSTEM FOR CLEANING AND RECOVERING SPILLED OIL IN THE OCEAN USING HAIR FELT ROLLERS

(71) Applicant: Mirza Faizan, Irving, TX (US)

(72) Inventors: Mirza Faizan, Irving, TX (US); Mirza Rizwan, Patna (IN); Zeyd Mohd Fahzy, Irving, TX (US); Abdallah Farooqui, Irving, TX (US); Adam Arsalan Jaffery, Arlington, TX (US); Abdul Basit Piracha, Euless, TX (US); Maheen Rafique, Southlake, TX (US); Salaah Asif Sayed, Irving, TX (US); Umar Ahmad Syed, Irving, TX (US)

(*) Notice: Subject to any disclaimer, the term of this patent is extended or adjusted under 35 U.S.C. 154(b) by 0 days.

(21) Appl. No.: 17/185,080

(22) Filed: Feb. 25, 2021

(65) Prior Publication Data

US 2021/0269997 A1    Sep. 2, 2021

Related U.S. Application Data

(60) Provisional application No. 62/982,708, filed on Feb. 27, 2020.

(51) Int. Cl.
*E02B 15/04* (2006.01)
*E02B 15/10* (2006.01)

(52) U.S. Cl.
CPC .......... *E02B 15/046* (2013.01); *E02B 15/103* (2013.01); *E02B 15/104* (2013.01)

(58) Field of Classification Search
CPC .... E02B 15/046; E02B 15/102; E02B 15/103; E02B 15/104

USPC .......... 210/242.3, 242.4, 923, 924
See application file for complete search history.

(56) References Cited

U.S. PATENT DOCUMENTS

| | | | | |
|---|---|---|---|---|
| 4,072,794 A | * | 2/1978 | Tomita | D06M 13/02 210/924 |
| 4,308,140 A | * | 12/1981 | Pierson, Jr. | E02B 15/046 210/242.3 |
| 4,555,338 A | * | 11/1985 | Marchionda | E02B 15/103 210/242.4 |
| 4,575,426 A | * | 3/1986 | Littlejohn | E02B 15/10 210/242.4 |
| 5,108,591 A | * | 4/1992 | Hagan | E02B 15/106 210/242.3 |
| 5,403,478 A | * | 4/1995 | Brinkley | E02B 15/104 210/242.4 |
| 5,423,985 A | * | 6/1995 | Addeo | E02B 15/101 210/242.4 |
| 5,453,191 A | * | 9/1995 | McCrory | E02B 15/10 210/242.4 |
| 6,146,529 A | * | 11/2000 | McCrory | E02B 15/101 210/242.4 |

(Continued)

*Primary Examiner* — Christopher Upton

(57) ABSTRACT

An oil spill retrieval system for retrieving spilled oil from the surface of a body of water and including a boat having means for collecting the oil from the water surface and having means for processing the collected oil. A pontoon boat that collects spilled oil from the ocean through a hair roller system suspended between the pontoons. Human hair is present within a porous casing of the roller and Oil floating on the water enters the porous casing whereupon the oil is absorbed by the human hair, wherein the absorbed oil is pass through one or more pipes to go into large pontoons which are the main oil collecting tanks on the pontoon boat.

7 Claims, 9 Drawing Sheets

(56) References Cited

U.S. PATENT DOCUMENTS

| | | | | |
|---|---|---|---|---|
| 6,372,134 B1 * | 4/2002 | Larsen | ................ | E02B 15/104 |
| | | | | 210/242.3 |
| 8,388,839 B1 * | 3/2013 | Hobson | ................ | E02B 15/103 |
| | | | | 210/242.4 |
| 8,741,133 B2 * | 6/2014 | Hobson | ................ | E02B 15/102 |
| | | | | 210/242.4 |
| 2012/0055856 A1 * | 3/2012 | Ratti | ................ | E02B 15/046 |
| | | | | 210/242.4 |

* cited by examiner

AUTOMATED SYSTEM FOR CLEANING AND RECOVERING SPILLED OIL IN THE OCEAN USING HAIR FELT ROLLERS

TECHNICAL FIELD OF THE INVENTION

The present invention relates generally to environmental disaster recovery and more specifically to a pontoon boat that clears oil spills in oceans utilizing a gear-driven hair felt roller system.

BACKGROUND OF THE INVENTION

Oil is a critical resource for the economy of the nations and the world. The massive demand for oil resulted in the incessant drilling to find oil reserves, which sometimes turns disastrous and results in oil spills. An oil spill is the release of a liquid petroleum hydrocarbon into the environment especially the marine ecosystem and coastal environments due to human activity. On account of lesser density than water, the spilled oil floats on the water surface and spreads to a large surface by the wind and the currents. Oil spills are hazardous to marine life and capable of destroying the entire ecosystem. The present invention is aimed at quickly cleaning the oil spills in the ocean in order to reduce its hazardous impact on marine and coastal life.

Oil spills cause serious environmental damage. As oil exploration, offshore drilling, oil production, and crude oil transport increase and affect more sensitive environments, rapid response to oil spills has become more important. Rapid containment and recovery of spills are crucial to minimizing environmental damage and cleanup costs. Numerous oil containment collection systems and systems have been developed, but traditional systems are inadequate, require excessive time to deploy, and limit visibility such as bad weather, rough seas, or fog or night Inefficient under the circumstances.

Environmental regulations, environmental group concerns, the drastically increasing cost of remediation of oil pollution and essential environmental policies are a number of factors that drive many companies seeking to tackle oil spills and seek new solutions. Yes, current management methods are inadequate for sudden oil leaks. However, effective options are limited, and effective technology is generally prohibitive and/or cannot provide sufficient protection.

Various devices are known in the art which surround and absorb or otherwise capture oil or other floating liquid materials. Some of these devices disclose fabric or netting containing filaments or other oil-absorbing material. These devices typically float upon the water and absorb water as the device contacts the oil spill. The device may be elongated so as to be formed around the oil and contain the oil spill The prior art discloses such varied absorption materials as hay, straw, bark, sawdust, urethane foam, nylon, rayon, polyester, glass, wool, and cotton.

Increasing concern over the need to economically and practically remove oil from water has prompted disclosure of many inventions, as evidenced by the following representative patents which have been preliminarily evaluated in the course of investigating the prior art:

U.S. Pat. No. 3,922,225 uses gravity, suction pumping to extract the oil but requires separation at various levels from other contents. WO2000053851A1 uses one big mat filled with human hair that absorbs oil from water sources and uses centrifugal force to remove the oil from the hair. However, this system uses a belt rather than gears, and the belt is more likely to rip. Moreover, the machine uses fuel which causes pollution, counterproductive to cleaning oil spills.

U.S. Pat. No. 5,453,191A is another attempt that uses human hair to clean oil spills within the water. Human hair is present within a porous casing. Oil floating on water enters the porous casing whereupon the oil is absorbed by the human hair. Flotation material is mixed with the human hair or attached to the casing to cause the device to float. There is no sophisticated system of collection of oil, once it is collected and the pouch is at maximum capacity, it has to manually be removed from the water source, not autonomous, making it a more cumbersome system of oil removal.

All of these conventional method/system or a computer program product, and some other Method/system presently known in the art have had some flaws in design or mechanism and lacks precision. Most of the existing devices are too expensive and time consuming to be practical for most users. Some shortfalls of the existing method/system or an Oil Spill Collector include machines using a fuel that causes pollution. In light of this, there is a need for a method/system or a computer program product that overcomes these constraints.

In the light of these facts, it is of great advantage that there is a system designed to clean out oil spills from water bodies to save the marine ecosystem using, unique hair-felt rollers that are made up through dense clipping of human or mammal's hair, a free substance which can be found in abundance.

Furthermore, something as useless as the hair is creative and an eco-friendly way to better the environment, not needing to create a new substance that may collect the oil.

Further, there is also a need for a boat that is designed to be autonomous, making it easy to use and without the need for large crews to overtake an oil clean-up excursion. Less human involvement also contributes further to the cost efficiency of this boat.

None of the above inventions and patents, taken either singly or in combination, is seen to describe the present invention as claimed. Thus, an Oil Spill Collector solving the aforementioned problems is desired.

Features and advantages of the invention will be set forth in the description that follows, and in part will be apparent from the description, or may be learned by practice of the invention. The advantages of the invention will be realized and attained by the structure particularly pointed out in the written description and claim hereof as well as the appended drawings.

It is to be understood that both the foregoing general description and the following detailed description are exemplary and explanatory and are intended to provide further explanation of the invention as claimed.

The present invention addresses the issues as discussed above.

Advantages of the Invention

One of the common reasons for oil spills in the marine ecosystem is human activity. Oil spills cause serious environmental damage. As oil exploration, offshore drilling, oil production, and crude oil transport increase and affect more sensitive environments, rapid response to oil spills has become more important. Rapid containment and recovery of spills are crucial to minimizing environmental damage and cleanup costs. Numerous oil containment collection systems and systems have been developed, but traditional systems are inadequate, require excessive time to deploy, and limit visibility such as bad weather, rough seas, or fog or night Inefficient under the circumstances.

In light of these facts, it is of great advantage that there is a system designed to clean out oil spills from water bodies to save the marine ecosystem. The unique hair-felt rollers are made up through dense clipping of human or mammal hair, a free substance that can be found in abundance. Repurposing something as useless as the hair is creative and an eco-friendly way to better the environment, not needing to create a new substance that may collect the oil. The current invention is designed to collect oil that can be put to refinement, making it a lucrative venture as well as an earth-friendly one.

The boat is designed to be autonomous, making it easy to use and without the need for large crews to overtake an oil clean-up excursion. Less human involvement also contributes further to the cost efficiency of this boat.

SUMMARY OF THE INVENTION

The object of the present invention is to overcome the disadvantages of the prior arts and provide an autonomous pontoon boat that collects oil wherein the system includes a hair roller system that is suspended between the pontoons with the help of chain pulleys/hydraulic system. These hair rollers are all chained in a continuous conveyor belt, in a free-spinning mechanism with sprockets at the end. These free-spinning rollers spin with the movement of the boat. When the rollers are at the bottom of the boat, they roll over the surface of the water, absorbing oil from it. After collecting oil, the rollers move up the conveyor belt wherein they spin at a high speed with the help of another high-speed conveyor belt/chain and sockets and excrete all the collected oil into an intermediate tank.

From the intermediate tank, the oil may pass through pipes to go into the large pontoons which are the main oil collecting tanks on the pontoon boat. There are plurality of sensors in the intermediate tanks that may signal when the maximum capacity in the pontoons is reached and the mechanism may shutdown. The boat may go straight to its main tanker to dock and deposit the collected oil. After emptying the pontoons, the boat is ready for further cleanup.

It is another object of the present invention to provide adjusting of the height of the hair-roller system depending on the density of water in the affected water body.

It is another object of the present invention to clean out oil spills from water bodies to save the marine ecosystem, with the help of human or mammal hair, a free substance that can be found in abundance.

It is another object of the present invention to provide for oil collecting tanks wherein the collected oil can be put to refinement, making it a lucrative venture as well as an earth-friendly one.

Other objects, advantages, and features of this invention will become more apparent from the following description.

The details of one or more implementations are set forth in the accompanying description below. Other aspects, features, and advantages of the subject matter disclosed herein will be apparent from the description and the claims.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

Features, elements, and aspects of the invention that are referenced by the same numerals indifferent figures represent the same, equivalent, or similar features, elements, or aspects in accordance with one or more embodiments.

Figure 1:
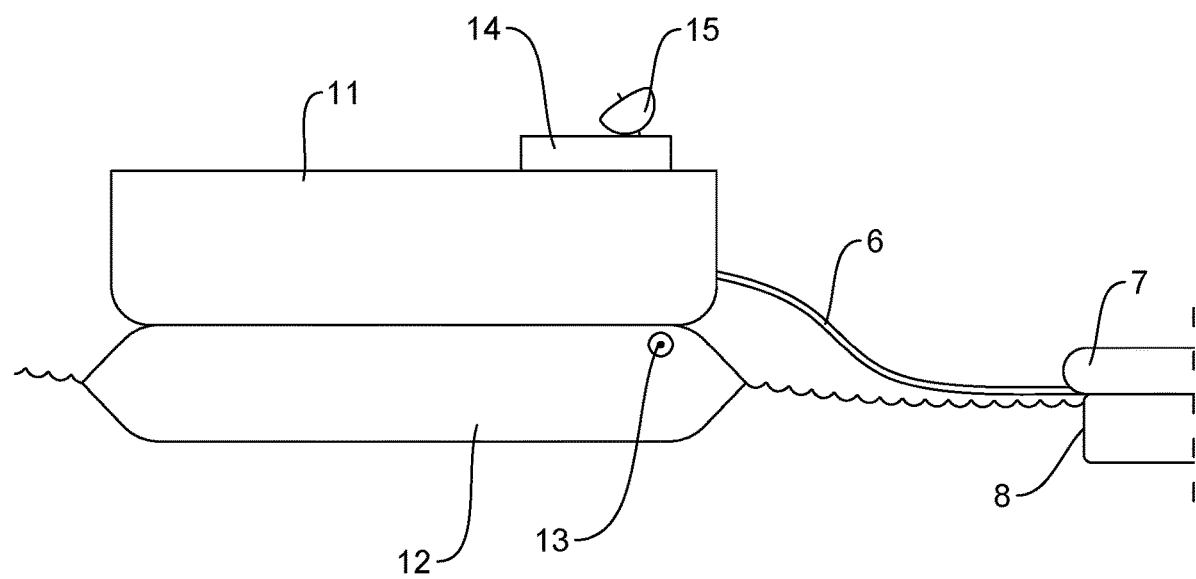

The following figure depicts a certain illustrative embodiment of the invention. This depicted embodiment is to be understood as illustrative of the invention and not as limiting in any way.

Referring particularly to the drawing for the purpose of illustration only and not limitation, there is illustrated:

FIG. 1 shows the side view of the pontoon boat as according to an embodiment of the present invention.

Figure 2:
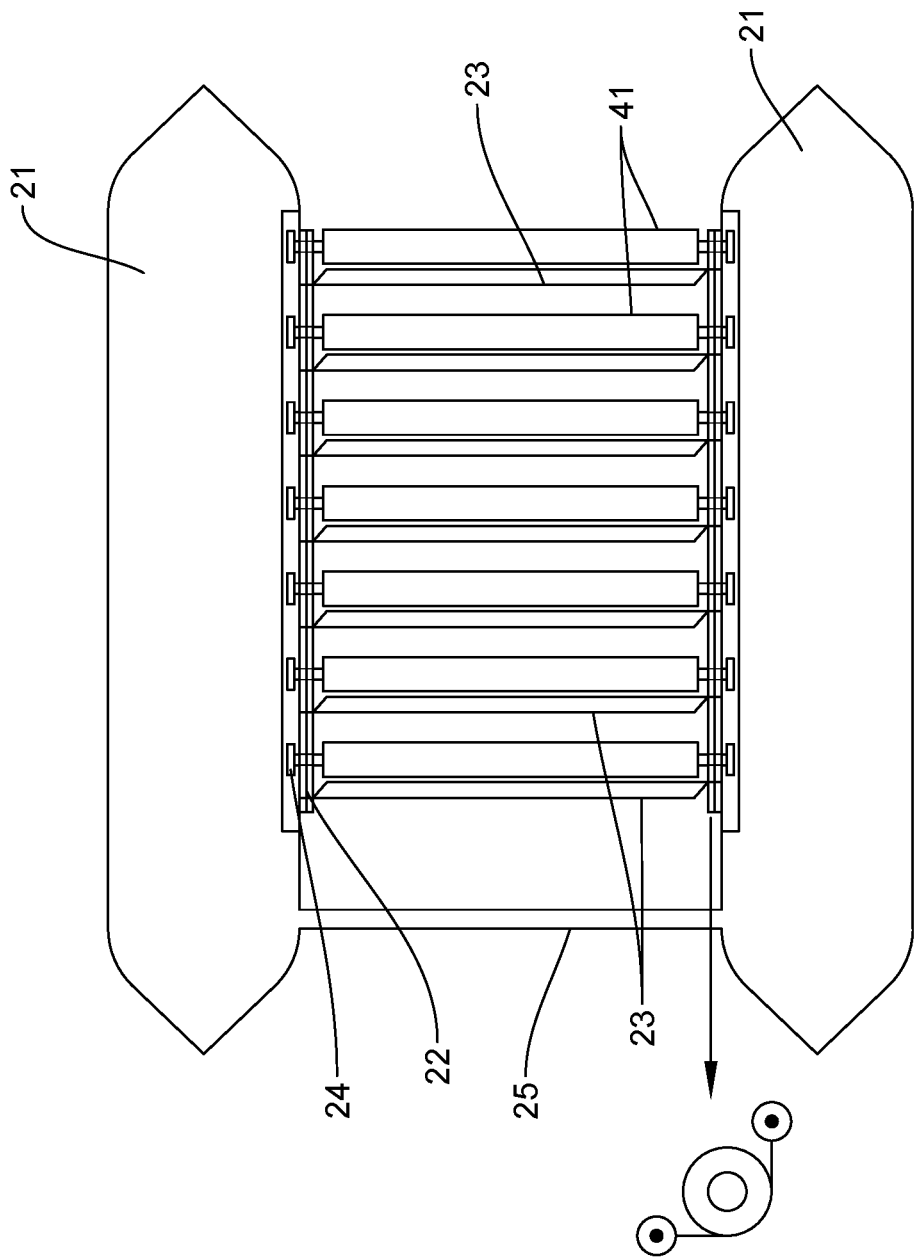

FIG. 2 shows the underneath view of the pontoon boat as according to one embodiment of the present invention.

Figure 3:
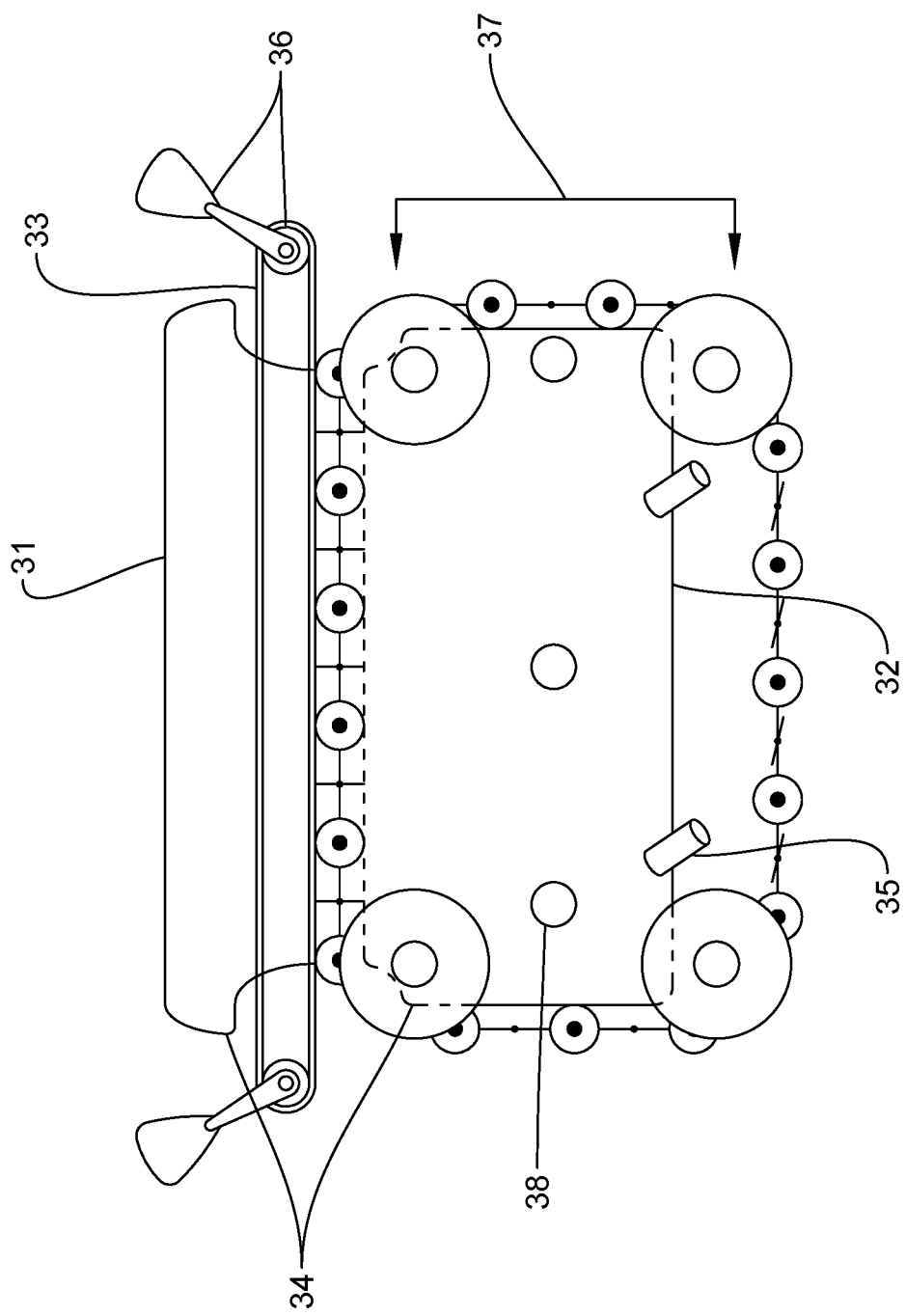

FIG. 3 shows a schematic block diagram of the oil collection system from the water surface of the ocean as according to one embodiment of the present invention.

Figure 4A:
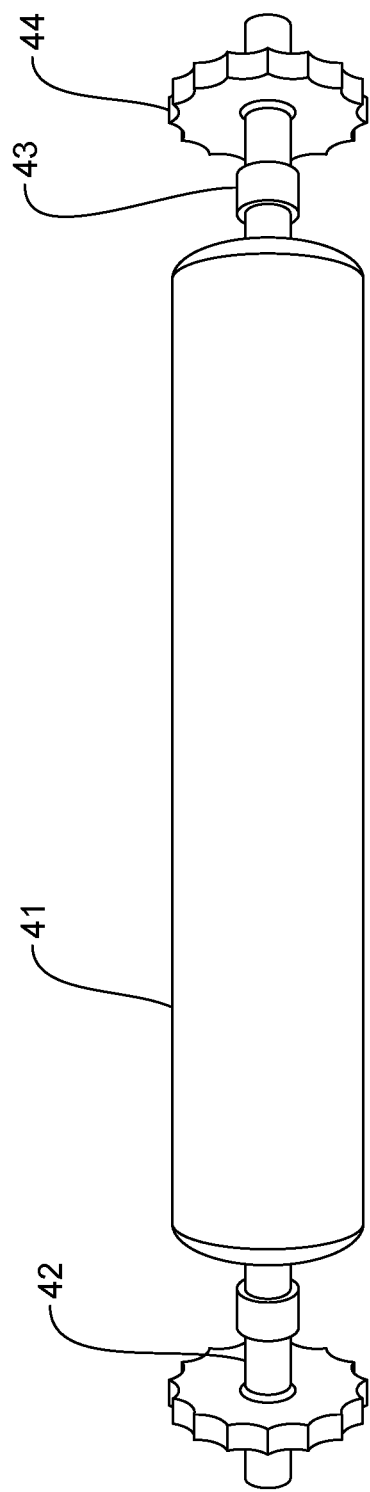

FIG. 4A shows the structure of the hair felt rollers according to one embodiment of the present invention.

Figure 4B:
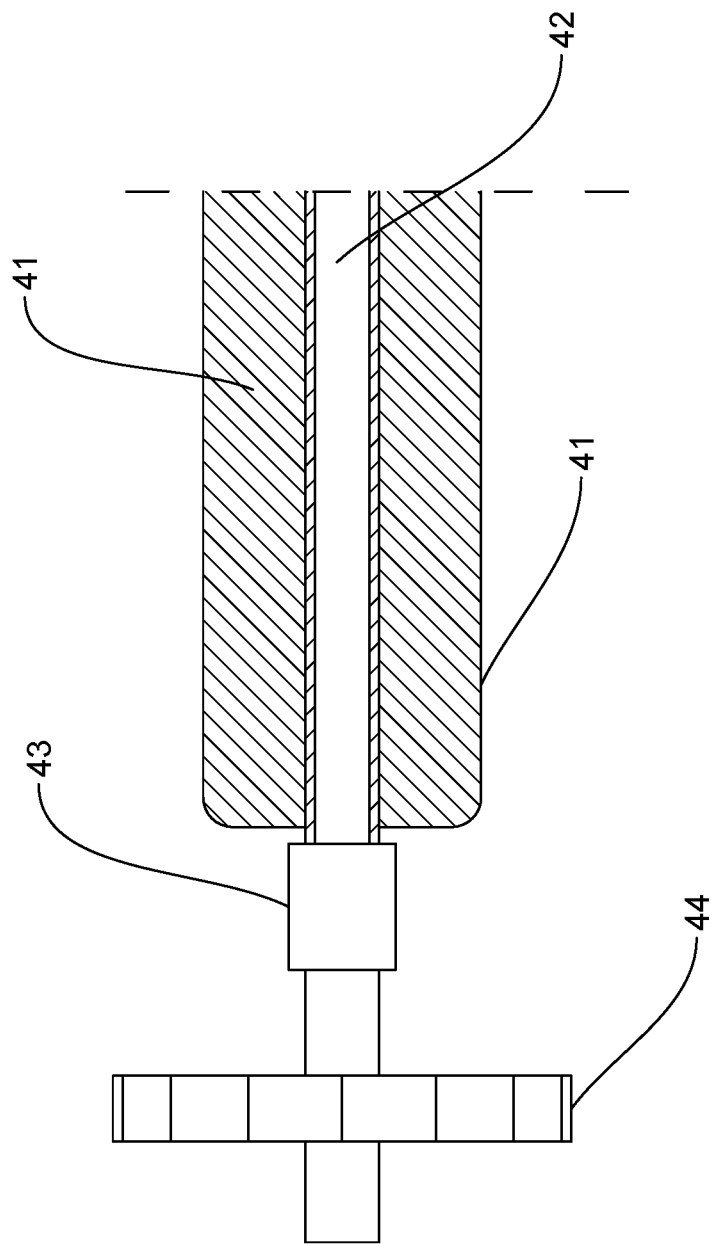

FIG. 4B shows the internal structure of the hair felt rollers according to one embodiment of the present invention.

Figure 5:
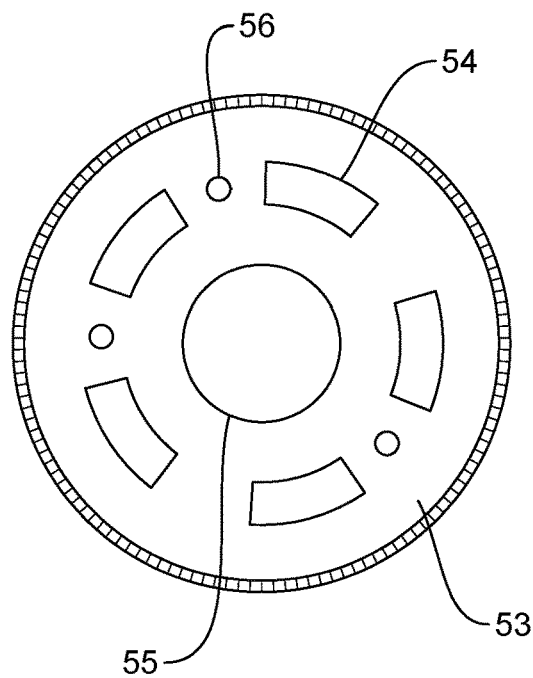

FIG. 5 shows the docking of oil depositing systems according to one embodiment of the present invention.

Figure 6:
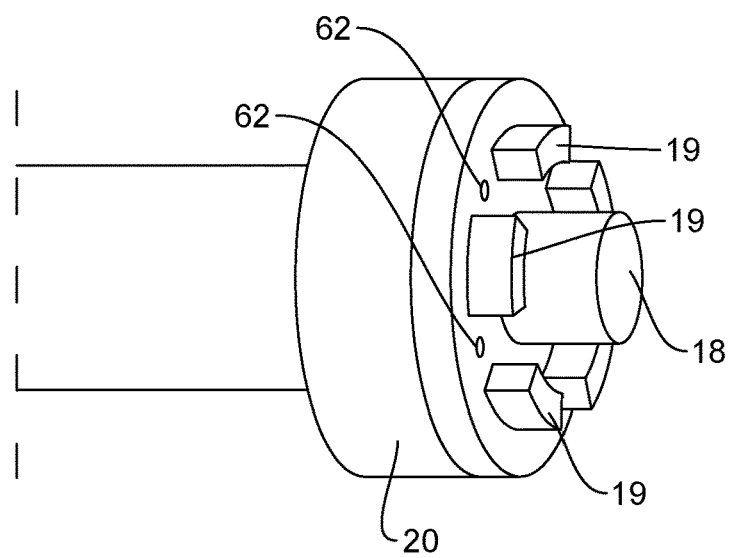

FIG. 6 shows locking mechanism of convey belt according to one embodiment of the present invention.

Figure 7:
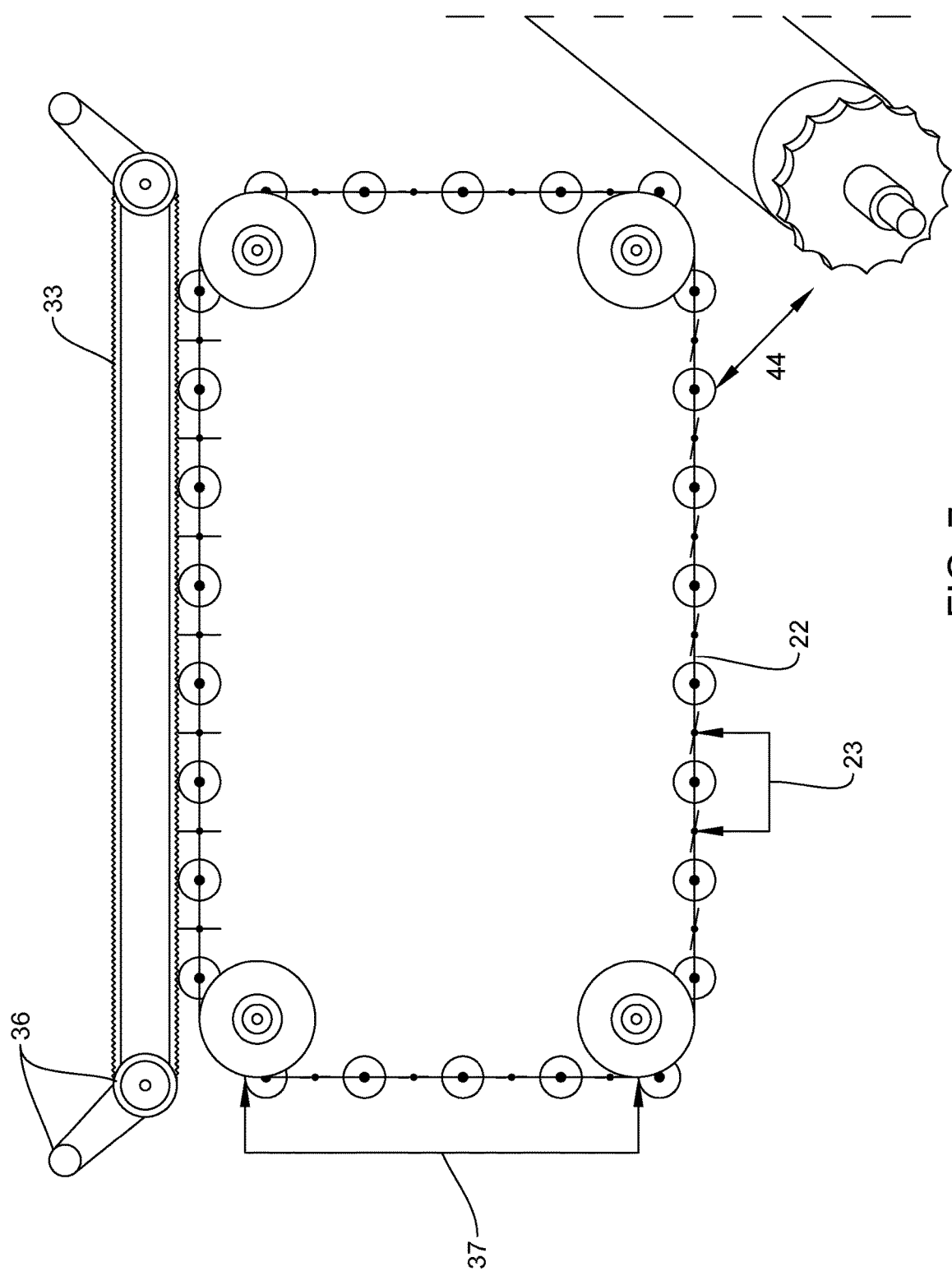

FIG. 7 indicates the mechanism of hair felt rollers according to one embodiment of the present invention.

Figure 8:
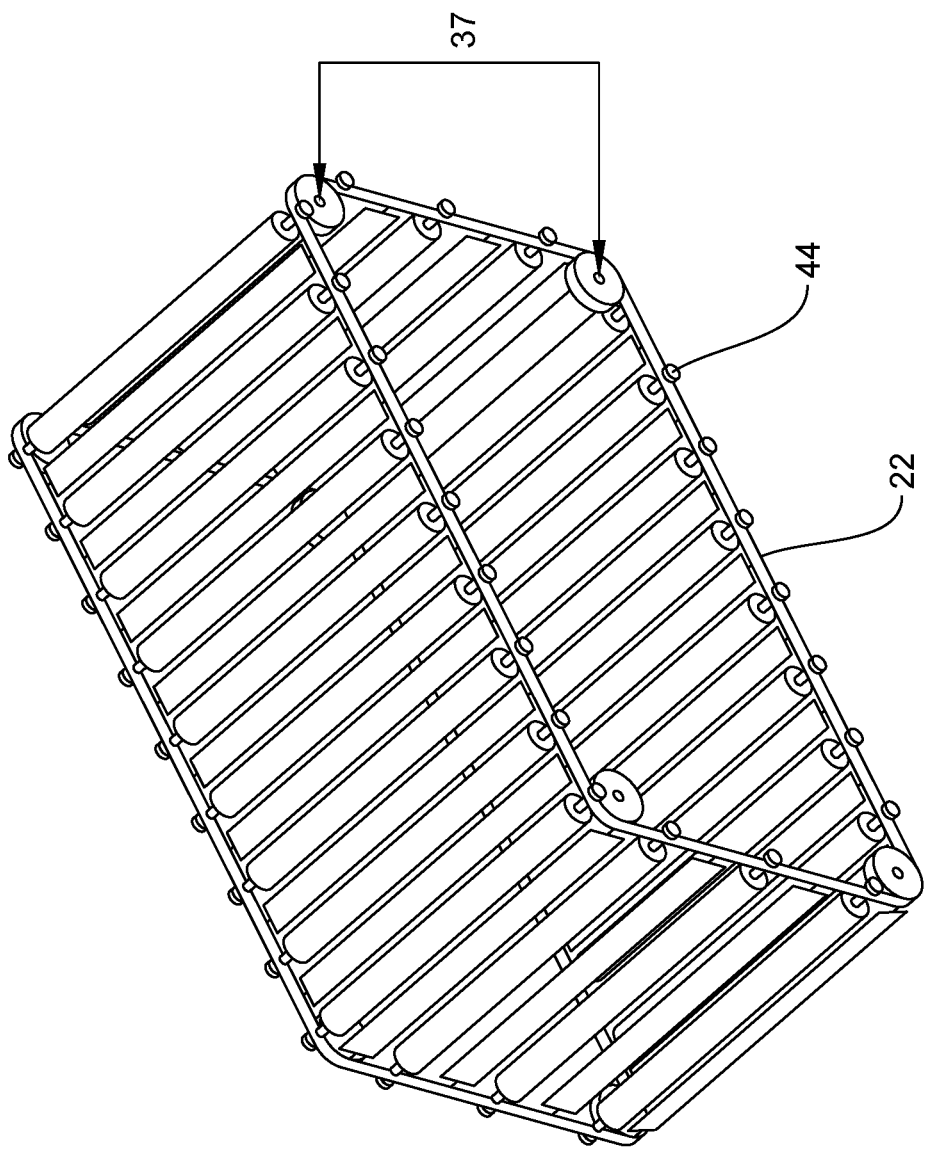

FIG. 8 is the three-dimensional view of the hair felt roller systems according to one embodiment of the present invention.

Figure 9:
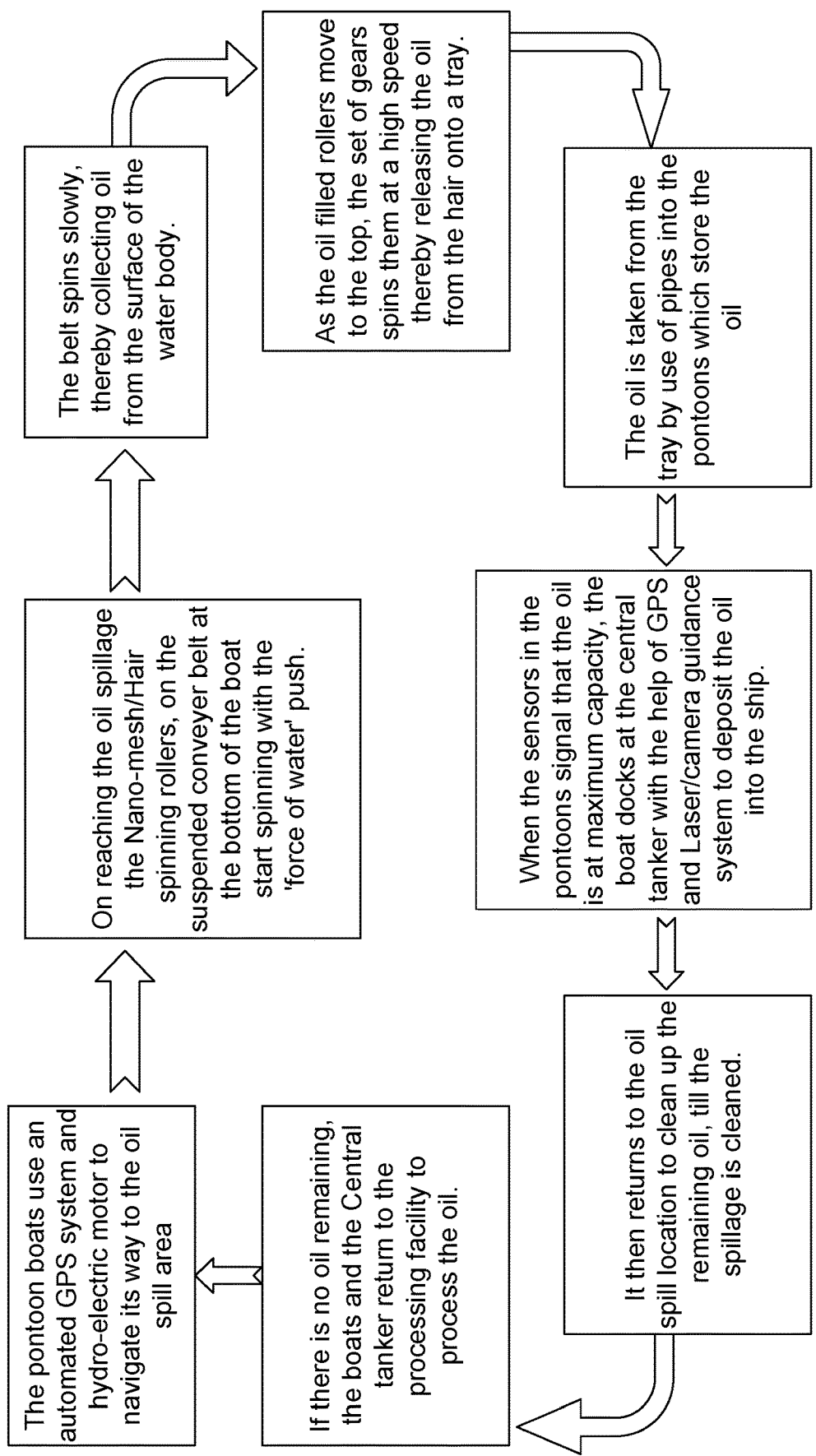

FIG. 9 is the block diagram of the working of the present invention.

DETAILED DESCRIPTION OF THE DRAWINGS

FIG. 1 shows the side view of the pontoon boat with the clear demarcation of the upper part 11 and the lower part 12 i.e pontoons. The upper part of the boat 11 has a housing of oil collection mechanism, whereas the lower parts are the pontoons 12 for the boat to serve as a means to float the boat, and to store oil from the collection process. The one side of the upper part of the boat 11 has a compartment 14 for housing all electronic systems requirements to control the boat floating and oil collection mechanism. Above the compartment 14, a Satellite Dish 15 may be communicatively attached for receiving GPS positioning to map the route for the oil spilled portion. The one side of the pontoons 12 has a mechanism 13 for docking and depositing oil to the main tanker beyond the present invention and a tank system 7 connects the roller portion 8 through a hydraulic mechanism or chain mechanism 6.

FIG. 2 shows the present invention pontoon boat from its base, which touches the water surface of the ocean. In between the two pontoons, 12 is the oil tanker 31 of cuboid shape. Several 'hair felt rollers' 41 separated with divider flaps 23 may be attached on conveyor belt 22, which can be seen in 3D view under FIG. 7. The conveyor belt 22 revolves the hair felt rollers 41 on four free moving gears 24 fixed around the oil tanker 31. Each hair felt rollers 41 may be capable of rotating on its axis, leading to its movement happening at two-level that is rotation and revolution under operative mode. Free rotating divider flaps 23 in between the hair felt rollers 41 are to prevent oil from transferring and splattering from one roller to another roller. Gears 24 at the end of the hair felt rollers 41 rotates them fast to release the oil to the main tanker 31. The collected oil in the main tanker 31 may then be transferred to the pontoons 12. To maintain the even distribution of collected oil, there is a connection pipe 25 between pontoons that may facilitate the docking and oil transfer. In the figure, there is shown 21, that may correspond to either side of the vessel.

FIG. 3 shows the oil collection system, where the oil collecting tank 31 fixed in between the pontoons 12 are surrounded by the fast-moving conveyor belt 33 as that of a chain of revolving and rotating hair felt rollers 41. The hair felt rollers 41 revolve through the outer bottom layer of oil collection tank 31 touching across the surface of the water to the inner top layer of the oil collection tank 31. When hair felt rollers 41 passes through the surface of water then its rotational speed absorb spilled oil from the water surface through centrifugal force and when the same hair felt rollers 41 passes through the oil collection tank 31, the small gears 36 and belts that move fast conveyor belt 33 further enhance the rotational speed of the rollers 41 to release absorbed oil in the oil collection tank 31. The oil tank opening is represented by 34. Pipe 35 connects oil collection tank 31 to pontoons 12 to instantly transfer collected oil to pontoons 12. Free moving gears 37 that supports the roller belt 22 are connected to the pontoons with hydraulic or chain pull connection 7 to adjust the height of the system from water when needed. The intermediate tank may have sensors 38 that may continuously sense the quantity of oil being transferred into the pontoons 12. Once the pontoons 12 have reached their maximum capacity, the transfer may stop and the device may signal the boat to go to the oil tanker and unload the oil. This intermediate oil collecting tank 32 is connected to the boats' Pontoons 12 with pipes 35 through which the oil may be transferred into the pontoons 12 on either side of the vessel.

FIGS. 4A and 4B show the structure of hair felt rollers 41 stuffed with hair clippings and wrapped around with hair felt element that may collect the oil from the surface of the water and transfer into the oil collection tank 31. The hair felt element is clipped upon hollow pipe 42 that stabilizes the roller 41 and helps it to spin and float on water. Free spinner nails 43 joined to a conveyor chain help the rollers 41 to glide on the water more efficiently. The Sprockets 44 joins the upper fast-moving conveyor belt 33 to draw out oil from the rollers 41 by centrifugal force.

FIG. 5 indicate the docking and oil depositing mechanism. The conduit 53 holds the pipe and docking teeth together. The Docking holes 54 get along the docking teeth to interlock. There may be hole 55 for the opposite pipe to fit into, to retrieve collected oil and a GPS and LASER guided system 56.

Further, the Pipe contains a vacuum pump to suck up collected oil from the pontoons 12 through GPS and LASER guided system 56. The pontoon boat reaches the bigger tanker to dock using its autonomous GPS system and its cameras and laser-guided system 56 to dock safely at the right spot. The collected oil is deposited at the main tanker by means of a pressure locked conduit. Once it locks into the main tanker, a vacuum pump on the main tanker sucks the collected oil from the pontoons through the conduit 53 into another pipe inside the tanker which leads to the main oil tank.

FIG. 6 shows locking mechanism of convey belt. In figure, it is shown that the conveyor belt to be attached to the system may have plurality of other parts integrally attached, as illustrated with reference 18,19,20, and 62.

FIG. 7 shows Hair Felt Rollers 41 mechanism with conveyor chain 22 that connects all rollers 4 land flaps 23 into a free 360-degree spinning mechanism. The gears 24 are connected to the pontoons 12 with hydraulic or chain pull connection to adjust the height of the system from water when needed. The free-moving gears 37 which runs with the movement of boat supports the roller conveyer belt 22 revolves the conveyer belt 22 that may results in the free spinning of hair felt rollers 41 with the sprockets 44 at the end. The free rotating divider flaps 23 between the hair felt roller 41 may serves the purpose of preventing splattering and transferring of oil from one roller to another roller 41. The Sprockets 44 joins the upper fast-moving conveyor belt to draw out oil from the rollers 41 by centrifugal force. After collecting oil, the rollers move upon the conveyor belt 22, spin at a high speed with the help of another high-speed conveyor belt/chain 33 and excrete all the collected oil. Furthermore, the small gears 36 are shown which enhances the rotation.

FIG. 8 is the three-dimensional view of the hair felt roller system according to one embodiment of the present invention. The rollers 41 which spins with the movement of the conveyer belt 22 are present alternatively with the flaps 23. The rollers 41 shown in the figure moves with the movement of conveyer belt 22. The free moving rollers 37 serve the purpose of free spinning of rollers 41 which are joined with sprockets 44. The free moving rollers 37 that support the conveyer belt 22 are connected to the pontoons 12 with hydraulic or chain pull connection as shown in FIG. 7 to adjust the height of the system from water when needed. The free rotating divider flaps 23 present alternatively with the hair felt roller 41 serves the purpose of preventing plattering and transferring oil from one roller to another roller 41.

FIG. 9 shows the block diagram of the working of the present invention. The pontoon boat uses an automated GPS system managed by the electronic system 14 and satellite dish 15 and navigates its way to the oil spill area. On reaching the oil spillage the hair rollers 41 on the suspended conveyer belt 22 at the bottom of the boat starts spinning with the "force of water" push. The conveyer belt spins slowly thereby collecting oil from the surface of the water body. As the filled roller moves to the top, the set of gears spins them at a high speed thereby releasing the oil from the hair into the tray. The oil is taken from the tray through the use of pipe into the pontoons 12 which stores the oil. When the sensors in the pontoons 12 signal that the oil is at maximum capacity, the boat docks at the central tanker with the help of GPS and LASER guided system 56 to deposit the oil into the ship. The pontoon boat again returns to the location to clean up the remaining oil, till the spillage is cleaned. If there is no oil remaining, the pontoon boat and Central tanker return to a processing facility to process the oil.

Furthermore, the present invention is a pontoon boat designed to clean out oil spills from water bodies to save the marine ecosystem. The body of the boat sits upon two pontoons that span the length of the hull of the boat. The entire oil collection system may sit in between these two pontoons. The boat may be powered by any source of energy. These components make the boat autonomous and remove the need for human interaction aboard.

The system for collecting oil sits partially within the body of the boat and partially submerged in water. The boats pontoons elevate and float the boat so that water doesn't come into the boat, where the system of hair rollers for oil collection sit.

The hair rollers are made up of human hair clippings retrieved by hair salons, tightly packed in the long oil absorbent booms (41), with their outer coverings made up of hair felt (41). They have a hollow metal pipe core (42) which may make these rollers stable and float over the water as shown in FIGS. 2 and 4(*b*). These rollers are connected with the chain connections and pulleys as shown in FIG. 3, FIG. 7 and FIG. 8.

These rollers, with free-spinning mechanism (43), may rotate and move over the conveyor belt/chain as the boat moves, absorbing oil from the surface of the water. As they reach the top after absorbing oil, these rollers may connect with a very fast-moving conveyor belt/chain moved by two or more sprockets (44). This fast-moving conveyor belt/chain (33) may connect the roller sprockets and spin them, at high speed, in the tank using centrifugal force. Due to this high-speed movement, the oil in the rollers may be released. Free moving rubber flaps (23) may be installed between the rollers to prevent oil splashing from one roller to another and may be collected into the intermediate oil collecting tank (32)

This intermediate oil collecting tank 32 is connected to the pontoons 12 with pipes 35 through which the oil may be transferred into the pontoons on either side of the vessel 21. The intermediate tank may have sensors 38 that may continuously sense the quantity of oil being transferred into the pontoons. Once the pontoons have reached their maximum capacity, the transfer may stop and the device may signal the boat to go to the mothership/bigger oil tanker to unload the oil.

The pontoon boat reaches the mothership/bigger tanker to dock using its autonomous GPS system and its cameras and laser-guided system 56 to dock safely at the right spot. The collected oil is deposited at the main tanker by means of pressure locked conduit (see FIGS. 5 and 6). Once it locks into the main tanker, a vacuum pump on the main tanker sucks the collected oil from the pontoons through the conduit into another pipe inside the tanker which leads to the main oil tank.

An autonomous pontoon boat that collects oil through a hair roller system that is suspended between the pontoons with the help of chain pulleys/hydraulic system. This system is primarily for the purpose of adjusting the height of the hair-roller system depending on the density of water in the affected water body. These hair rollers are all chained in a continuous conveyor belt, in a free-spinning mechanism with sprockets at the end. These free-spinning rollers spin with the movement of the boat. When the rollers are at the bottom of the boat, they roll over the surface of the water, absorbing oil from it. After collecting oil, the rollers move up the conveyor belt, spin at a high speed with the help of another high-speed conveyor belt/chain and sockets and excrete all the collected oil into an intermediate tank.

From the intermediate tank, the oil may pass through pipes to go into the large pontoons which are the main oil collecting tanks on the pontoon boat. The sensor in the intermediate tanks may signal when the maximum capacity in the pontoons is reached and the mechanism may shut down. The boat may go straight to its main tanker to dock and deposit the collected oil. After emptying the pontoons, the boat is ready for further cleanup.

In an embodiment of the present invention, the plurality of interconnected devices to enable the removal of oil may be integrated with plurality of cameras and other types of sensors, such as thermal sensors for the purpose of real time monitoring of internal devices of the system.

It is therefore submitted that the instant invention has been shown and described in what is considered to be the most practical and preferred embodiments. It is recognized, however, that departures may be made within the scope of the invention and that obvious modification will occur to a person skilled in the art. With respect to the above description then, it is to be realized that the optimum dimensional relationships for the parts of the invention, to include variations in size, materials, shape, form, function, and manner of operation, assembly and use, are deemed readily apparent and obvious to one skilled in the art, and all equivalent relationships to those illustrated in the drawings and described in the specification are intended to be encompassed by the present invention.

While in the foregoing specification, several embodiments of the invention have been set forth for purposes of making a complete disclosure, it will be apparent to those skilled in the art that numerous changes may be made without departing from the spirit and principles of the invention.

References to "one embodiment," "an embodiment," "at least one embodiment," "one example," "an example," "for example," and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Various embodiments of the invention have been disclosed. However, it should be apparent to those skilled in the art that modifications in addition to those described, are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or utilized, or combined with other elements, components, or steps that are not expressly referenced.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. Although the present invention has been explained in relation to its some embodiments, it is to be understood that many other possible modifications and variations can be made without departing from the Spirit and Scope of the invention as hereinafter claimed.

DRAWINGS—REFERENCE NUMERALS

11 The upper part of the boat
12 Pontoons of the boat (lower part)
13 Docking mechanism
14 Electronics housing Compartment
15 Satellite Dish
22 Conveyor Belt
23 Rotating divider flaps
24 Gears
25 The connecting pipe between two pontoons
31 Oil collection tanks (oil tanker)
32 Intermediate collecting Tank
33 Fast-moving conveyor belt/chain
34 Oil collection tanks opening
35 A pipe connecting Oil collection tank to pontoons 36 Small Gears
37 Free moving gears that support the roller belt
41 Hair felt rollers
42 Hollow Pipe
43 Spinner nails
44 Sprockets
53 The conduit
54 Docking holes
55 Pipe passing hole
56 Lasers Guidance System
19 Interlocking Teeth
18 Body holding conduit together
20 Pipe containing vacuum pump
62 laser guidance receivers

The invention claimed is:

1. A system on pontoon boat for cleaning oil spill, wherein the system comprising:
   at least a boat, wherein the boat allows the system to rest on the surface of the body of water from which the oil is to be removed;
   at least a roller, on which plurality of human or mammal hairs are fixed which serves the purpose of absorbing the oil from the water surface, supported by the boat, wherein said rollers are rotatable about an axis;
   at least one divider flap attached between said rollers, wherein said divider flap is rotatable between said rollers;
   a first conveyor belt coupled to said rollers and said divider flaps, wherein said first conveyor belt is configured to rotate the said rollers;
   at least one free moving gears connected with said first conveyor belt, wherein said free moving gears is configured to rotate with a movement of said boat to revolve said first conveyor belt;
   a motor operatively connected to the said roller, wherein the motor is configured to rotate the roller about its axis of rotation;
   a second conveyor belt coupled with said motor, wherein said second conveyor belt is configured to spin said roller at high speed which serves the purpose of excreting the absorbed oil; and
   an intermediate tank, wherein the intermediate tank of the boat is configured to collect the excreted oil from the roller.

2. The system as claim 1, wherein the boat further comprises one or more collection tanks, wherein the collection tanks collects oil from the intermediate tank through one or more pipes.

3. The system as claim 1, wherein the roller of the boat system is connected to the boat such that said oil is raised and separated from said water.

4. The system as claim 2, further comprising a communicatively coupled camera, wherein said camera is configured to remotely control the one or more pipes.

5. The system of claim 4, wherein said camera is further configured to remotely control the intermediate tank or the one or more collection tanks.

6. The system of claim 1, wherein the collected oil is further pumped to the one or more collection tanks by one or more pipes based on a sensor input.

7. The system of claim 6, wherein said sensor input is an alert generated in a real time at an instance when the intermediate tank is completely filed.

* * * * *